United States Patent [19]

Baker

[11] 3,958,444

[45] May 25, 1976

[54] SEMI-AUTOMATIC VALVE CONTROL FOR A PROVER LOOP

[75] Inventor: Edward A. Baker, Woodsboro, Tex.

[73] Assignee: Sun Pipe Line Company, Tulsa, Okla.

[22] Filed: Jan. 27, 1975

[21] Appl. No.: 544,079

[52] U.S. Cl. .................................................. 73/3
[51] Int. Cl.² ......................................... G01F 25/00
[58] Field of Search ...................... 73/3; 137/625.43

[56] References Cited
UNITED STATES PATENTS

| | | | |
|---|---|---|---|
| 3,472,280 | 10/1969 | Van Scoy | 137/625.43 |
| 3,605,810 | 9/1971 | Moroney | 137/625.43 |
| 3,668,923 | 6/1970 | Grove et al. | 73/3 |
| 3,682,198 | 11/1970 | Davis et al. | 73/3 |
| 3,798,957 | 3/1974 | Shannon et al. | 73/3 |

Primary Examiner—S. Clement Swisher
Assistant Examiner—Denis E. Coor
Attorney, Agent, or Firm—J. Edward Hess; Donald R. Johnson; Gary V. Pack

[57] ABSTRACT

In a prover loop used to calibrate positive displacement meters, such as those used on a LACT-unit (Lease Automatic Custody Transfer) in the petroleum industry, a control system is provided for operating the prover loop valve. This control system is designed to operate so that each prover loop test is conducted under identical conditions. The system design permits easy conversion from the conventional hydraulic systems.

7 Claims, 4 Drawing Figures

U.S. Patent  May 25, 1976  Sheet 1 of 2  3,958,444
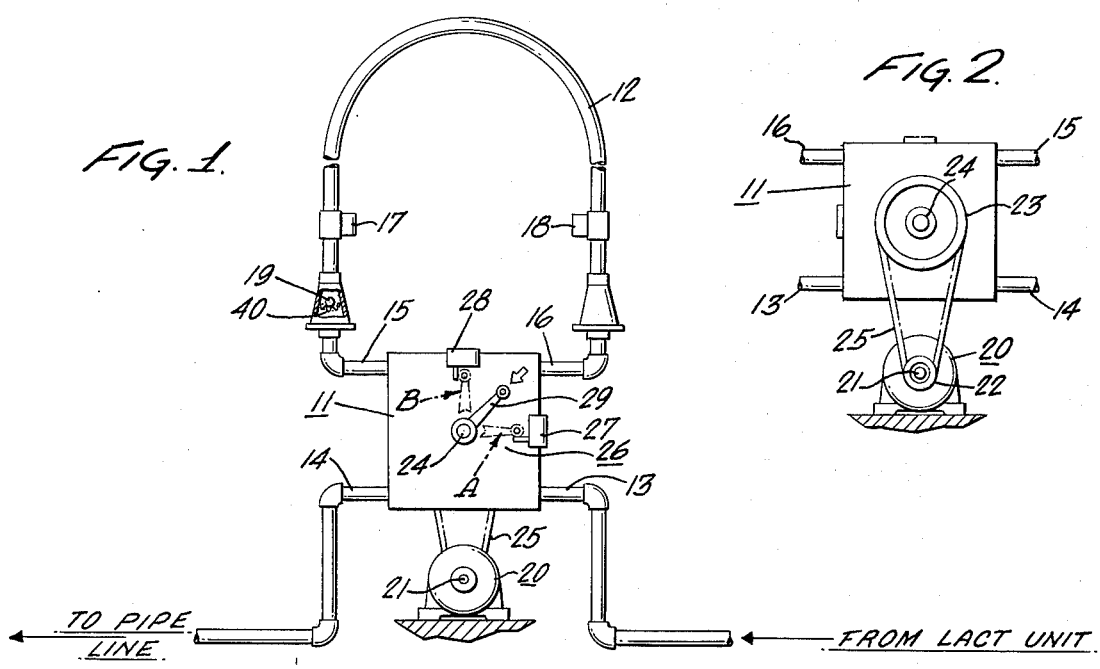
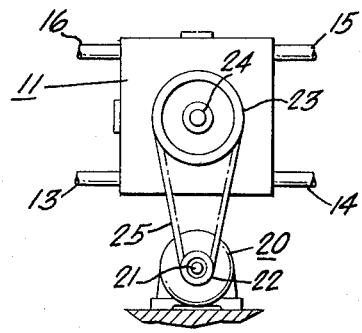
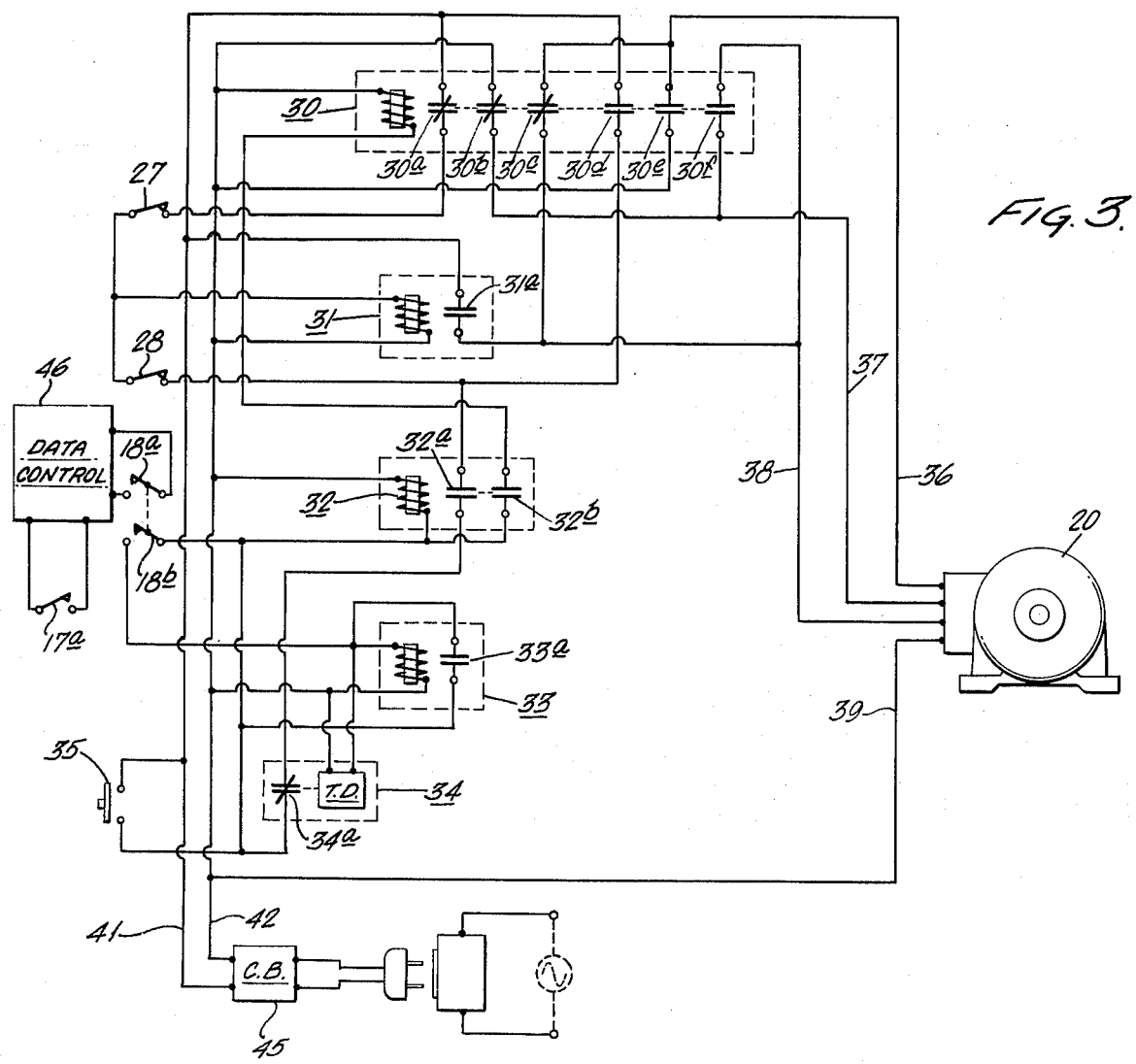

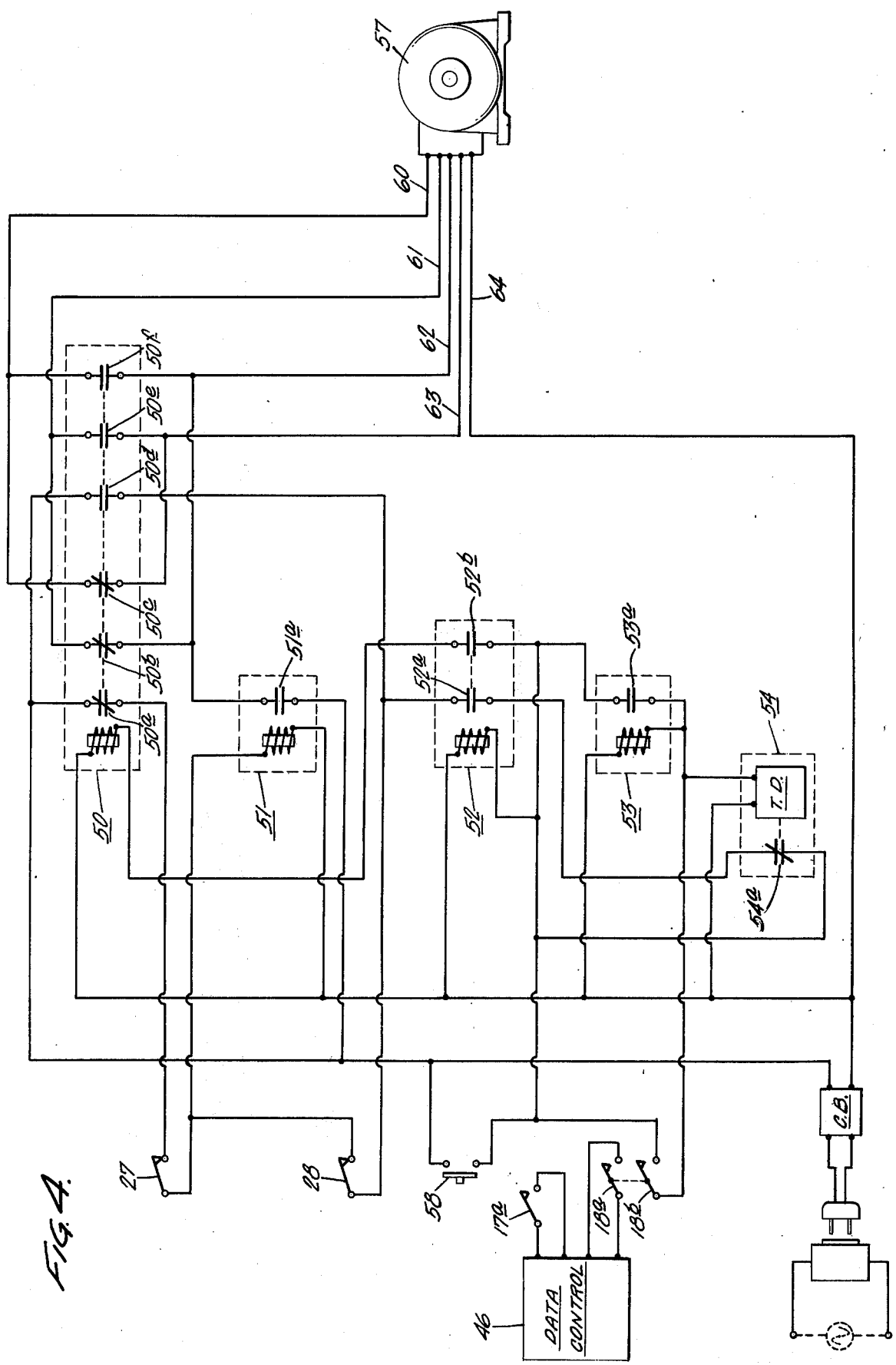

SEMI-AUTOMATIC VALVE CONTROL FOR A PROVER LOOP

BACKGROUND OF THE INVENTION

1. Field of the Invention

This invention relates to a system for controlling valves, and more particularly to an automatic system for controlling the valve on a prover loop during a test.

2. Description of the Prior Art

The prover loop system for which this invention was designed is usually connected in series with a pipeline from a LACT unit, downstream from the flowmeter in the LACT unit. The prover loop typically has a control valve which reverses the flow through the prover loop. Inside the prover loop is a flexible sphere which is pushed through the prover loop by the flow of oil or other hydrocarbon. Two sphere detectors are located at known distances apart on the inside of the prover loop. The time it takes for the sphere to travel between the two sphere detectors is determined and used to calculate the flow rate, thereby calibrating the LACT unit flow meter. It is customary in the industry to use one "round trip" to complete one test. Three consecutive test results within a certain tolerance are required before a flow meter's accuracy can be certified. Industry standards require these flow meters to be calibrated once a month.

By necessity, the prover loop calibration must be precisely controlled in order to obtain accurate results. Heretofore, prover loop controls have employed a hydraulic system for operating the prover loop valve which reverses the flow direction within the prover loop. These hydraulic systems are expensive and usually require at least a 1 K.V.A. transformer to meet the necessary power requirements. Also, the hydraulic systems require constant operator attention to achieve the three consecutive test results within the required tolerance. The operator must use a stop-watch so the same amount of liquid flows through the LACT unit flow meter each time the valve is reversed. Fractions of a second can greatly affect the test results. Extreme temperatures also affect the viscosity of the liquid, thereby varying the time it takes to change valve positions. Because of these inaccuracies, the prover loop operator can often waste much time trying to obtain the three consecutive tests within the given tolerance.

SUMMARY OF THE INVENTION

The disclosed invention minimizes the problems encountered in the prior art. Briefly, the invention comprises a system which controls a ¼ horsepower 115 V.A.C. reversible motor which actuates the control valve. The prover loop control valve is belt driven by the motor. A valve position indicator has two microswitches located on the indicator dial so that when the control valve rotates into one of the two positions one of the switches opens. One of the single pole sphere detector switches is converted to a double pole switch and connected in with the control system. Relays in the control circuit are connected so that when the prover loop operator pushes the start button, the control valve rotates into position and the test begins, completes a round trip, and ceases operation in the same timed sequence for each test. Between valve actuation periods, the oil is free to flow through the prover loop and around the sphere without interruption.

This design reduces the varibles encountered in the prior art systems. The electric motor is virtually insensitive to fluid viscosity, thereby providing constant actuation periods for various viscosity conditions. The control circuit activates the electric motor at the same stages in each test, thereby permitting the same amount of oil to flow through the prover loop during each test. As a result, each test produces more accurate results, usually within the acceptable tolerances. Less expense is involved for initial, operational, personnel, inventory, and maintenance costs.

A better understanding of the invention and its advantages can be seen in the following description of the figures and the preferred embodiments.

DESCRIPTION OF THE DRAWINGS AND PREFERRED EMBODIMENT

FIG. 1 is a schematic view depicting the prover loop control valve and valve position indicator connected to the LACT unit;

FIG. 2 is a schematic view of the driving connection of the motor to the control valve;

FIG. 3 is a circuit diagram of the control system according to this invention for a reversible motor having four electrical leads;

FIG. 4 is a possible circuit diagram of a control system according to this invention for a reversible motor having five electrical leads.

FIG. 1 shows the location of prover loop control valve 11 in prover loop 12. Four pipe leads 13, 14, 15 and 16 connect to control valve 11. Pipe lead 13 comes from the LACT unit flow meter (not shown). Pipe lead 14 continues to the pipe line carrying the oil or other hydrocarbon to a distant location. Pipe leads 15 and 16 are connected to the prover loop 12. Sphere detectors 17 and 18 are mounted on prover loop 12. Sphere detector 17 has a single pole, normally opened switch 17a connected to the data controls 46. Sphere detector 18 has a double pole, normally opened switch with switch 18a connected to the control circuit and switch 18b connected to the data controls. Each detector has a probe (not shown) extending into prover loop 12. A flexible sphere 19, preferably made of polyurethane, is contained inside prover loop 12. When sphere 19 is pushed under a sphere detector, the probe is deflected and normally opened detector switches 17a, 18a, and 18b are closed.

Control valve 11 is designed so that it has two operating positions, A and B, and a rest position. The control circuit in this invention switches control valve 11 into the proper position and at the correct time. A small reversible motor 20, for example a ¼ horsepower 115 V.A.C. reversible motor, is used to change the valve positions. As shown in FIG. 2, a small diameter, grooved pulley 22 is secured to shaft 21 of motor 20, and a large diameter, grooved pulley 23 is secured to control valve shaft 24. Transmission belt 25 transmits the driving force from small pulley 22 to large pulley 23, thereby rotating control valve 11.

Control valve 11 has a valve position indicator 26 which shows what position control valve 11 is in. Normally closed microswitches 27 and 28 are located on position indicator 26 in such a position that when control valve 11 is in operating position A, indicator arm 29 opens microswitch 27, and when control valve 11 is in operating position B, indicator arm 29 opens microswitch 28. The rest position is indicated halfway between positons A and B by an arrow. This position is used on portable prover loop systems when they are disconnected from the LACT unit in order to prevent fluid from escaping from the loop. This position is obtained by opening circuit breaker 45 manually when the control valve is in the rest position.

FIG. 3 shows the preferred control circuit for prover loop testing according to this invention and how it is connected with prover loop 12 and its related components. Included in this circuit design are four relays 30, 31, 32 and 33. Relay 30 has six contact switches, three of which are connected in the normally closed position and the other three are connected in the normally open position. Relay 31 and 33 each have one contact switch, 31a and 33a, both connected in the normally open position. Relay 32 has two contact switches, 32a and 32b, both wired in the normally open position. Time delay switch 34a of time delay 34 is connected in the normally closed position. Push button 35 remains in the normally open position. Four motor leads 36, 37, 38 and 39 are connected to motor 20.

These elements are connected as indicated to provide a sequential operation called a "round trip test", which will now be described.

Control valve 11 is rotated to position A when the circuit is energized, thereby allowing oil to flow through pipe leads 13 and 16, counterclockwise through prover loop 12, through pipe lead 15 and into the pipeline through pipe lead 14. Sphere 19 rests against a grating 40 in prover loop 12 at a point where the diameter of the pipe is larger than sphere 19, thereby allowing the oil to flow around the sphere. To begin a round trip test, control valve 11 is then switched to position B, which reverses the flow through prover loop 12. In position B, sphere 19 is pushed by the flow of oil under sphere detector 17 and sphere detector 18. The time interval required to flow this distance is indicated by the closing of detector switches 17a and 18a and is recorded. Control valve 11 is then switched back to position A, thereby reversing the flow of oil again. The time interval required for sphere 19 to be pushed from detector 18 to detector 17 is again recorded. Then the flow rate can be calculated from these time intervals and compared to the LACT flowmeter reading. This concludes a round trip test. It is this sequence that is precisely controlled by this invention.

A description of how the control circuit illustrated in FIG. 3 operates to achieve this sequence follows. The control circuit is energized when power is provided to leads 41 and 42 by closing circuit breaker 45. Assuming control valve 11 is in its rest position, microswitches 27 and 28 are presently closed. Relay 31 is activated, closing contact switch 31a. Motor lead 38 is then connected to lead 41 and energized. Motor lead 36 is also energized at this time through contact switch 30c of relay 30. Motor lead 37 is connected to lead 42 through contact switch 30b and motor lead 39 is directly connected to lead 42 at all times. Since all four leads 36, 37, 38 and 39 of motor 20 are energized, motor 20 rotates in a clockwise direction and control valve 11 is switched into position A. Motor 20 stops when indicator arm 29 contacts and opens microswitch 27, thereby de-activating relay 31 and opening contact switch 31a. Control valve 11 is now completely in position A.

When beginning the round trip test, the prover loop operator presses push button 35. Relay 32 is then activated, closing contact switches 32a and 32b. At the same time, relay 30 is activated by the closing of contact switch 32b. Consequently, contact switches 30a, 30b and 30c are opened and contact switches 30d, 30e and 30f are closed. Relays 30 and 32 remain activated when push button 35 is released because they are now energized through contact switches 32b, 32a and 30d. When relays 30 and 32 are activated, relay 31 is also activated, thereby causing motor 20 to rotate valve 11 into position B. Motor 20 rotates in the counterclockwise direction because motor leads 36 and 37 are now electrically reversed. Motor lead 36 is now connected to lead 42 through contact switch 30e and motor lead 37 is connected to lead 41 through contact switches 30f and 31a. When control valve 11 reaches position B, indicator arm 29 contacts and opens microswitch 28. Relay 31 is then de-activated, which opens contact switch 31a and turns off motor 20. However, relays 30 and 32 remain activated. The oil is now flowing clockwise around prover loop 12.

Sphere 19 is pushed through prover loop 12, deflecting detector switches 17a, 18a and 18b. When detector switch 18b is closed by sphere 19, relay 33 is activated, closing contact switch 33a. Relay 33 remains activated after sphere 19 passes detector switch 18 because relay 33 is energized through contact switch 33a. Time delay switch 34 is also activated. After a certain time delay interval, for example 1.75 seconds, the normally closed contact switch 34a is opened. This action causes relays 30, 32 and 33 to be de-activated, thereby opening contact switches 30d, 30e, 30f, 32a, 32b and 33a and closing contact switches 30a, 30b and 30c. Relay 31 is now activated, closing contact switch 31a and starting motor 20. Motor 20 is rotating in the clockwise direction since motor leads 36 and 37 have been switched back to their original position. Once control valve 11 reaches position A, indicator arm 29 opens microswitch 27, causing relay 31 to be de-activated and motor 20 to cease operation. Sphere 19 is now pushed under detectors 18 and 17, completing a round trip test. Sphere 19 is then lodged against grating 40 in the larger diameter portion of prover loop 12 allowing the oil to continue to flow around sphere 19 and through the prover loop essentially without restriction.

Another possible circuit design is illustrated in FIG. 4. This system is specifically designed to control the operation of a motor having five electrical leads (60–64). Again, four relays, 50, 51, 52 and 53, and a time delay switch, 54, are used. As in the previous circuit, normally closed microswitch 27 is located at position A on the valve position indicator and normally closed microswitch 28 is located at position B. When the circuit is energized, relay 51 is activated, thereby closing its contact switch 51a and causing motor 57 to rotate in the clockwise direction. Switch 27 opens when position A is reached, turning motor 57 off. When normally open push button 58 is pressed, relays 50 and 52 are activated, causing relay 51 to be activated, contact switches 50d, 50e, 50f, 51a, 52a, and 52b to be closed, contact switches 50a, 50b, and 50c to be opened, leads 60 and 61 of motor 57 to be electrically reversed, and motor 57 to rotate in the counterclockwise direction. Switch 28 is opened when the valve reaches position B, causing relay 51 to de-activate and motor 57 to stop rotating.

As in the previous circuit, normally opened detector switch 18b is connected in with the control circuitry. Switch 18b is closed when the sphere passes under sphere detector 18, causing relay 53 and time delay switch 54 to be activated. Time delay contact switch 54a is opened within a predetermined time span after switch 18a is closed. Relays 50 and 52 are de-activated and relay 53 is activated. Motor 57 now is rotating in the clockwise direction and stops when the valve is in position A and switch 27 is opened. This circuit has all the advantages enumerated above on the circuit design illustrated in FIG. 3.

From the above disclosure, it can be seen that this invention provides an automatic control system for a prover loop and its control valve which greatly improves the accuracy of calibration tests conducted by this apparatus. The invention causes the prover loop flow to be reversed at the same time for each test, thereby assuring that the same volume of liquid flows through the meter being tested during each test. Use of an electric motor to switch the prover loop control valve causes the control valve to be switched in essentially the same timed sequence for each test, even in conditions of extremely high or low viscosity.

While particular embodiments of this invention have been shown and described, it is obvious that changes and modifications can be made without departing from the true spirit and scope of the invention. It is the intention of the appended claims to cover all such changes and modifications.

The invention claimed is:

1. In an apparatus for calibrating a flow meter which comprises,
    a. a conduit section forming a prover loop, having enlarged sections on either end;
    b. a valve for connecting the prover loop in series in a pipeline with the flow meter, and having a first position in which fluid from the pipeline passes through the loop in a first direction and a second position in which fluid passes through the loop in a second and opposite direction;
    c. a sphere positioned within the loop so that it can be forced through the loop by the flow of fluid through the loop;
    d. a first sphere detector located at a first location on the loop, for detecting the passage of the sphere past the first location and for producing a first signal;
    e. a second sphere detector, located at a second location on the loop spaced from the first location a predetermined distance, for detecting the passage of the sphere past the second location and for producing a second signal, and
    f. means for measuring the time elapsed in passage of the sphere between the two sphere detectors, an improvement for controlling the valve to provide a round trip test, comprising:
    g. means for changing the valve from the first position to the second position, whereby the flow of fluid through the loop will change from the first direction to the second direction, causing the sphere to be forced through the loop by the flow of fluid, passing the first sphere detector and then the second sphere detector; and
    h. means, responsive to the sphere completing passage through the predetermined distance between the first and second sphere detector, for causing the valve to change from the second position to the first position, so that the flow of fluid through the loop will change from the second direction to the first direction, causing the sphere to be forced back through the loop by the flow of liquid before it reaches the enlarged section of the prover loop, passing the second sphere detector and then the first sphere detector.

2. Apparatus recited in claim 1, wherein the means for changing the valve position from the first position to the second position acts in response to a start signal to cause the valve to change from the first position to the second position.

3. Apparatus recited in claim 1, wherein the means for causing the valve to change from the second position to the first position is responsive to the second signal produced by the second sphere detector, which indicates the sphere has completed passage through the predetermined distance between the first and second sphere detector.

4. Apparatus recited in claim 3, further comprising means for delaying the changing of the valve from the second position to the first position a predetermined length of time after the signal from the second sphere detector is produced.

5. Apparatus recited in claim 3, wherein the means for changing the valve position includes an electric motor.

6. Apparatus recited in claim 3, wherein the means for changing the valve position includes:
    a. a reversible electric motor;
    b. means for detecting when the valve is substantially in the first position or the second position;
    c. relay means for controlling the direction of the motor rotation and connected to the valve position detection means so that the motor is turned off when the valve reaches the first position or the second position.

7. Apparatus recited in claim 1 comprising, in addition, a "rest" position on the valve which prevents the flow of any fluid through the valve and means for moving the valve from the rest position into the first position.

* * * * *